Jan. 14, 1930.

W. E. SHORE

INTERNAL COMBUSTION ENGINE

Original Filed Feb. 9, 1924

Re. 17,565

3 Sheets-Sheet 1

Inventor.
William E. Shore
by H. J. S. Dennison
Atty.

Jan. 14, 1930.

W. E. SHORE

INTERNAL COMBUSTION ENGINE

Re. 17,565

3 Sheets-Sheet 2

Original Filed Feb. 9, 1924

Inventor.
William E. Shore
by A. J. S. Dennison
atty.

Jan. 14, 1930.

W. E. SHORE

INTERNAL COMBUSTION ENGINE

Re. 17,565

Original Filed Feb. 9, 1924

3 Sheets-Sheet 3

Inventor.
William E. Shore
by H. J. S. Dennison Atty

Reissued Jan. 14, 1930

Re. 17,565

UNITED STATES PATENT OFFICE

WILLIAM E. SHORE, OF CASTLETON CORNERS, STATEN ISLAND, NEW YORK

INTERNAL-COMBUSTION ENGINE

Original No. 1,633,909, dated June 28, 1927, Serial No. 691,610, filed February 9, 1924. Application for reissue filed May 3, 1929. Serial No. 360,287.

In the operation of internal combustion engines, it is highly desirable to utilize the heavier oils and in a manner different from that accomplished in the type operated by the high temperature of compression, such as the Diesel type.

The principal object of this invention is to devise means for preparing heavy oils for combustion with a limited compression and so that the engine may be controlled in a similar manner to the present known controls where light fuels are used, thereby effecting a very material reduction in the cost of operation of such engines.

A further and important object is to accomplish the unification of internal combustion engines for various uses.

The principal feature of the invention consists in the novel use of a vapor expanding mechanism to expand the heavy oil in the presence of an expansible medium in conjunction with means for utilizing the exhaust heat from the engine cylinders to further expand and gasify the mixture to produce a combustible vapor which may be further aerated and may be throttle controlled.

The accompanying drawings illustrate diagrammatically the application of the present invention:—

Fig. 1 being a sectional diagram showing an engine cylinder and the course of the exhaust gases therefrom together with the expanding mediums;

Figure 1:
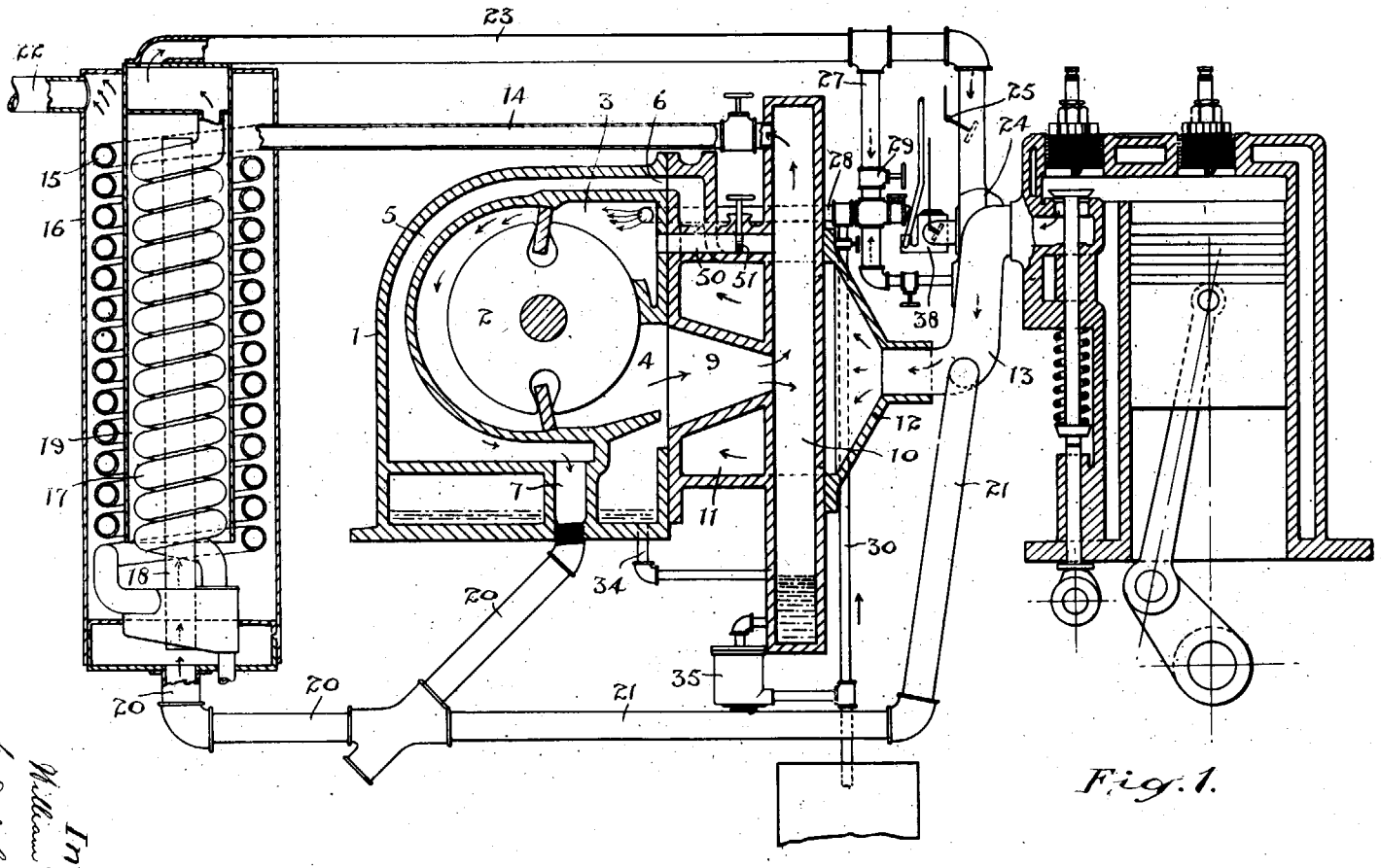

Referring to the accompanying diagrams, 1 represents a type of rotary vaporizer in which the rotor 2 eccentrically arranged in the cylindrical casing, expands the medium entering the inlet chamber 3 and discharges through the outlet 4. This vaporizer is provided with a hollow jacket 5 through which a heating medium is circulated from the inlet 6 at the top to the outlet 7 at the bottom.

A hollow casing 8 abuts the face of the vaporizer 1 having a converging channel 9 leading from the outlet 4 of the vaporizer and directing the vaporized fuel into a vertically disposed chamber 10.

The hollow jacket 11 of the casing 8 surrounds the converging channel and the central portion of the chamber 10, openings to the jacket being arranged either side of the chamber 10 and communicating with a cone-shaped cap 12 to which the exhaust pipe 13 of the engine is connected.

The exhaust gases entering the cap 12 strike directly against the outer face of the chamber 10, thus imparting the heat of the exhaust gases directly to the wall of said chamber and said gases, passing around said chamber completely, surround the converging channel 9 and flow through the inlet 6 of the jacket 5 of the rotary vaporizer.

The vaporized fuel being discharged from the rotary vaporizer through the channel 9 impinges directly upon the hottest portion of the chamber 10, and it is thus further expanded.

A tube 14 leads from the upper end of the chamber 10 and is connected to a spiral coil 15, which is arranged within a cylinder 16 and the lower end of the coil 15 is connected with a smaller coil 17 arranged axially of the coil 15 and encircling a heater pipe 18.

A cylindrical casing 19 extends downwardly from the top of the cylinder 16, and divides the interior of the cylinder 16 into two compartments, connecting only at the lower end.

The heater pipe 18 connects with a pipe 20 leading to the outlet 7 from the jacket of the rotary vaporizer and also is connected to a pipe 21 which connects directly with the exhaust pipe 13 of the engine.

The upper end of the pipe 18 opens into the inner casing 19 at the top and the exhaust gases travel downwardly in the interior of the casing 19 around the heater coil 17 and flow outwardly at the bottom. These gases flow upwardly between the inner casing 19 and the cylinder 16, imparting their excess heat to the coil 15 and finally exhaust through the pipe 22.

The vaporized oil and gases taken from the chamber 10 by the tube 14 are subjected to very intense heat and are carried from the top of the coil 17 through a pipe 23 leading to the intake manifold 24 of the engine.

A throttle 25 is arranged in the pipe 23 and an adjustable air valve 26 is provided to allow of the inlet of a suitable quantity of air to mix with the highly vaporized and heated fuel.

A by-pass pipe 27 is connected with the pipe 23 and leads to the inlet pipe 28 leading to the inlet chamber 3 of the rotary vaporizer.

A suitable control valve 29 is arranged in the pipe 27 so as to shut off the by-passing of a portion of the vaporized fuel back to the vaporizer if desired.

Figure 4:
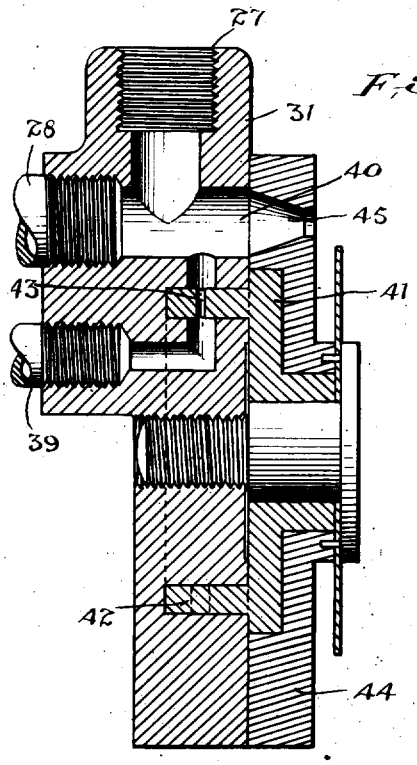
Fig. 4 is an enlarged sectional detail of the oil mixing valve.
Figure 5:
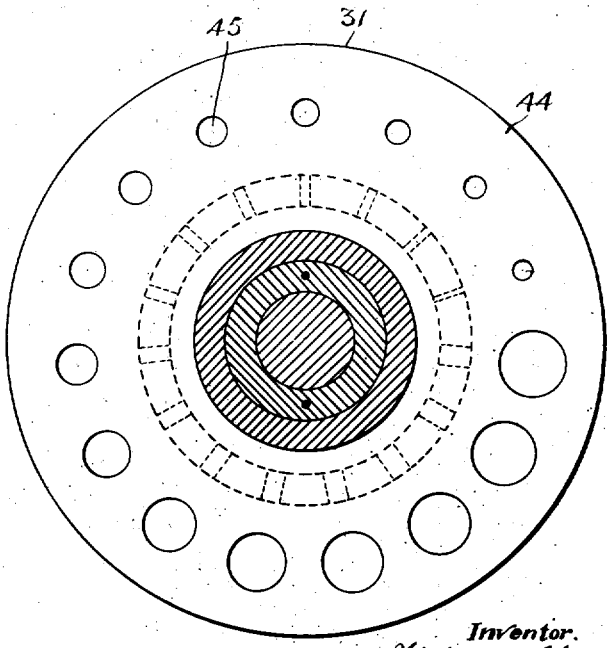
Fig. 5 is an elevational part sectional view of the adjusting members of the mixing valve.

The oil feed pipe 30 leading from a suitable source of oil supply is connected to the pipe 28 and a suitable mixing valve 31 (see Figs. 2, 4 and 5) is arranged in this pipe to enable the oil fuel to be regulated.

A branch pipe 32 may be connected to the exhaust pipe of the engine to allow the use of a certain amount of the hot gases of exhaust to mix with the air and oil being directed to the vaporizer.

Figure 2:
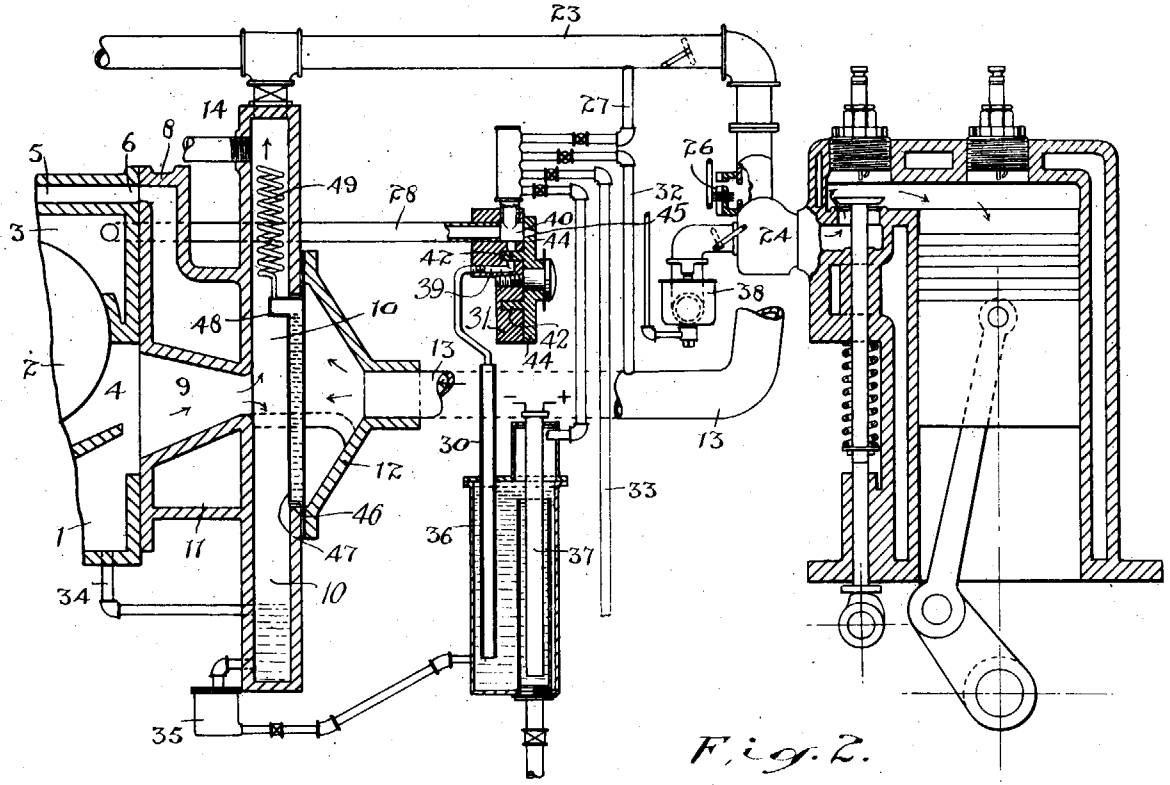
Fig. 2 is a sectional diagram similar to Fig. 1, but illustrating the oil feed connections to the vaporizer and the connections to the intake of the engine.

A further branch 33 may be provided as shown in Fig. 2 for supplying various gases, such as hydrogen gas, natural gas or calcium carbide gas to the mixer.

A drain pipe 34 is connected with the bottom of the oil well in the rotary vaporizer 1 and to the bottom of the chamber 10.

Any condensate gathering in the bottom of the chamber 10 is taken therefrom through the trap 35 and delivered to the oil supply to be again circulated.

The oil supply pipe 30 is shown in Fig. 2 as leading from a casing 36, the feed pipe to which has inserted therein an immersion heater 37. The heater is inserted into the inlet tube in order to create a high velocity of flow and prevent coking upon the surface of the heater.

A suitable gasoline carbureter 38 is provided connected with the intake manifold 24 for the starting of the engine.

The rotary vaporizer is operated from the engine in any suitable manner and the suction of the vacuum side draws the supply of oil and the expansible material, such as air or gas, thereto. The supply of air or gas is regulated by the valve 31, which is shown in detail in Figs. 4 and 5, as having an inlet passage 39 connected with the oil supply, said passage leading to a chamber 40 connected with the inlet pipe 28.

The flow of oil is regulated by rotating the flanged disc 41, the flange 42 of which is perforated with a plurality of graduated holes 43.

A disc 44 is rotatably mounted upon the valve and is provided with a plurality of graduated openings 45 which lead to the chamber 40.

The branch pipe 27 also connects to the chamber 40 leading to the inlet 28.

By this arrangement a very considerable range in the adjustment of mixtures can be made.

In the structure illustrated in Fig. 2 the chamber 10 is formed with an opening 46 opposite to the outlet 4 from the vaporizer and in this opening is placed a sheet metal casing 47 which is provided with an offset portion 48 at the top end extending inwardly into the chamber. This casing is partially filled with mercury which absorbs and retains a very high temperature and presents a surface against which the atomized fuel impinges as it is discharged through the outlet 4.

The enlarged upper portion 48 of the casing 47 forms an expansion chamber which is brought into contact with the flowing gases and imparts heat thereto after the first contact.

The heat of the exhaust may be so intense as to vaporize the mercury but such vaporization does not occur until a very high temperature is reached, approximately 650° F. and in order to ensure the maximum quantity of heat produced by the engine exhaust being imparted to the vapor in passage, a tubular coil 49 extends upwardly from the expansion chamber 48 of the casing 47 in the upper end of the chamber 10. This coil forms a condenser for the mercury vapor which may rise from the body of mercury in the casing 47.

In the operation of this invention, the engine is first started by the use of a lighter fuel, such as gasoline which is fed through the carbureter 38 to the engine intake. The exhaust from the engine passes into the jacket 11 and around the jacket 5 of the vaporizer and continues on through the coil heater from which it is exhausted.

The rotor of the vaporizer is operated in a suitable manner from the engine and the suction of the intake draws the fuel oil from the oil supply through the mixing valve 31 and also draws in the desired quantity of expansible gas or air which acts as a carrier for the fuel.

The supply of oil and air and gases can be regulated as desired by means of the adjustments of the mixing valve and the control valves arranged on the various feed pipes and the mixture entering the intake chamber 3 of the rotary vaporizer is expanded and the oil is broken up into fine particles in the expansion of the medium and it is discharged through the outlet 4 in the form of a fine vapor. The heat of the exhaust gases surrounding the vaporized material assists in this expansion and vaporization and the vaporized oil and gases are directed through the outlet 4 into contact with the intense heat of the chamber 10 against which the exhaust gases impinge and which as described may constitute a mercury chamber. A greater heat and consequent expansion is thus imparted to the vaporized fuel which is carried then through the coils 15 and 17 in the presence of the heat from the exhaust gases flowing through the heater and the continued association of the oil in the finely vaporized state with the carrying gases, it is believed, probably effects a chemical change in the hydrocarbons to such an extent that the gas taken from the final heater coil may be mixed with a further quantity of air as it is introduced into the engine.

When the vaporization of the oil fuel is thus effected the gasoline feed is cut off and the fuel oil gas is directed into the engine cylinders. The produced gas is of such a nature that it ignites readily with the ordinary spark and the engine may operate indefinitely with the fuel thus provided.

It will be readily understood that a further great latitude exists in the quality of the fuel by reason of the provision for the introduction of various gases, even including some of the inert gases of combustion of the engine in order to impart sufficient heat under certain conditions.

Figure 3:
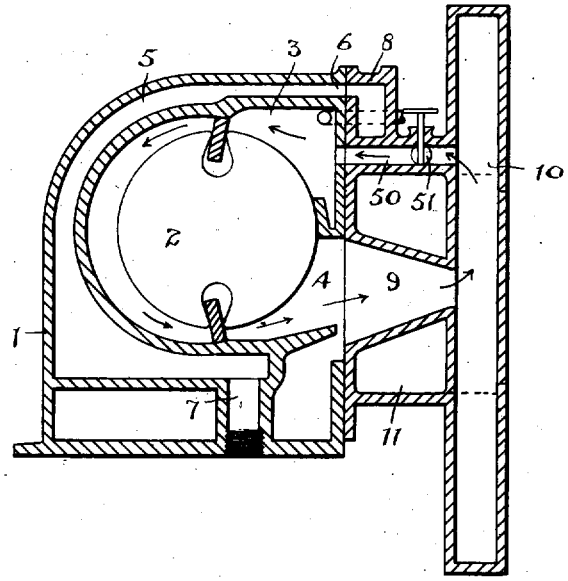
Fig. 3 is a sectional detail of the vaporizer illustrating the manner of by-passing or internally circulating the oil carrying expansible medium.

In the commencement of the operation of the engine it is usually found desirable to run the engine for a short period on the gasoline fuel and when this is being done the vaporized fuel is circulated in a closed cycle by being by-passed through the passage 50. This is particularly illustrated in Fig. 3 showing the valve 51 in the by-pass 50 open.

The continuation of the operation of this closed cycle for a short time raises the temperature of the produced gas to a very fine state of volatility and it may then be turned into the engine in place of the gasoline, it being vaporized to a state in which it will float and mix with atmosphere without velocity to hold the fuel in suspension.

This system of carbureting heavy oils makes it possible to operate engines at high speed and with variable control while using heavy oil fuel.

This invention enables oil to be burnt in engine cylinders under the same conditions as is gasoline. Complete combustion takes place because the exhaust is colorless and without odor and there is no sediment or residue in the operation as described.

The system of carburetion herein described consists in applying external mechanical energy which is given up and absorbed as internal heat energy as mechanical energy is first used to expand the elements under vacuum and high velocity mixing the fuel with a suitable gas such as hydrogen, natural gas, coal gas or even inert gas from the exhaust of the engine or atmosphere. These gaseous mediums are mixed with the oil under an isothermal expansion and discharged under an adiabatic condition, giving up the heat energy to the fuel as a complete cycle.

The fluid vapor is discharged under a substantially adiabatic condition against a superheating means and increases in volume and consequently in velocity as it passes in contact with the superheating elements. The temperature is increased as it progresses until a chemical reaction, or absorption probably takes place between the finely divided hydrocarbons and the hydrogen or other carrying gases and when brought to this state the vapor can be mixed with atmosphere in the cylinder of the engine to give the desired result.

It will therefore be understood that an oil may be used containing the maximum quantity of B. t. u. per unit as the mechanical breaking up and subsequent chemical reaction places the particles in suspension so as to ensure its maintenance in a gaseous state.

The exhaust temperatures from an engine may run to a very high point which when transmitted to the conduit conducting the vaporized oils might have the effect of coking the vapors and I have shown in Fig. 2 a means for governing the temperature condition of the conduit leading from the vaporizer. This means is shown in the form of a casing containing a fluid heat distributor which is preferably mercury as it does not vaporize until it reaches a very high temperature, consequently the casing arranged in the path of the nebulized oil will not convey extremely high temperatures of the engine exhaust and coking will be avoided.

Having thus described my invention, what I claim as new and desire to secure by Letters Patent of the United States is:—

1. The combination with an internal combustion engine, of a vapor expanding mechanism having a chamber extending therearound immediately contacting with the inner wall thereof and connected with the exhaust from the engine, means for feeding a hydrocarbon in the presence of a restricted quantity of an expansible suspension medium to said vapor expanding mechanism, a discharge conduit leading from said vapor expanding mechanism and extending through said surrounding chamber, a chamber having an opening in one wall connected with said discharge conduit and having the wall opposite interposed in the path of the engine exhaust and adapted to intercept the exhaust as it passes from the engine to said surrounding chamber, means for superheating the vapor as it passes out from said discharge receiving chamber and a conduit leading from said superheating means to the intake manifold of the engine.

2. The combination with an internal combustion engine, of a mechanical vaporizer, a conduit leading from the discharge of the vaporizer and surrounded by a heating jacket connected with the engine exhaust, a fluid chamber arranged in the path of the discharge from the vaporizer and in the path of the discharge from the engine exhaust adapted to receive the heat from the exhaust and to impart said heat to the vapor discharged from the vaporizer, a condenser connected with said fluid chamber arranged in the path of the flow of the vapor, a superheater heated by the engine exhaust and connected with the discharge from the vaporizer, a conduit leading from the superheater to the engine intake, means for controlling the flow of air to the engine intake, means for returning a portion of the vapor to the vaporizer, and means for feeding oil to the vaporizer.

3. The combination with an internal combustion engine, of a rotary vaporizer having a jacket heated by the engine exhaust, a pipe leading to the intake of the vaporizer, a valve connected with said pipe, an oil supply connected with said valve, means for regulating the oil supply arranged in said valve, means for regulating the air supply through said valve, means for conducting a gas supply to said valve, means for superheating the vaporized mixture discharge from said vaporizer, means for directing a portion of said superheated mixture back to the vaporizer along with a fresh supply of oil and supporting medium, and means for regulating the mixture of air with the vaporized superheated fuel flowing to the engine.

4. The combination with an internal combustion engine, of means for mechanically vaporizing an oil fuel in a restricted quantity of supporting expansible gas insufficient to support combustion, means for regulating the flow of oil and expansible gas to said atomizer, means for expanding said incomplete mixture, means for superheating said mixture while still in its incomplete expanded state, means for conducting said expanded superheated vapor to the engine, and means for mixing atmosphere with said superheated incomplete mixture to complete the same while in its expanded form.

5. The combination with an internal combustion engine of means for mechanically producing expansion and contraction to facilitate vaporization of a liquid fuel in a restricted quantity of supporting expansible gas insufficient to support combustion, whereby an incomplete overrich mixture is formed, means for regulating the relative flow of liquid and expansible gas to the mechanical vaporizer, means for heating said incomplete over-rich mixture, while still in its incomplete state, means for conducting said heated mixture to the engine, and means for mixing atmospheric air with said heated mixture to complete the same, and means for mixing atmospheric air with said heated mixture to form a combustible mixture of suitable fuel-air ratio.

6. The combination with an internal combustion engine of a charge forming device having means for mechanically producing expansion and contraction to facilitate vaporization of a liquid fuel in a restricted quantity of supporting expansible gas insufficient to support combustion, whereby an incomplete over-rich mixture is formed, means for heating said incomplete over-rich mixture, while still in its incomplete state, means for conducting said heated mixture to the engine, and means whereby atmospheric air is mixed with said overrich mixture to complete the same.

7. The combination with an internal combustion engine of rotary means for mechanically vaporizing a liquid fuel and a restricted quantity of supporting expansible gas insufficient to support combustion, whereby an incomplete over-rich mixture is formed, means for regulating the relative flow of liquid and expansible gas to the mechanical vaporizer, means for heating said incomplete over-rich mixture, while still in its incomplete state, means for conducting said heated mixture to the engine, and means for mixing atmospheric air with said heated mixture to form a combustible mixture of suitable fuel-air ratio.

8. The combination with an internal combustion engine of a charge forming device having rotary means for mechanically producing expansion and contraction to facilitate vaporization of a liquid fuel in a restricted quantity of supporting expansible gas insufficient to support combustion, whereby an incomplete over-rich mixture is formed, means for heating said incomplete over-rich mixture, while still in its incomplete state, and means for conducting said heated mixture to the engine.

9. The combination with an internal combustion engine of heat jacketed rotary means for mechanically vaporizing liquid fuel and a restricted quantity of supporting expansible gas insufficient to support combustion, whereby an incomplete over-rich mixture is formed, means for regulating the relative flow of liquid and expansible gas to the mechanical vaporizer, means for heating said incomplete over-rich mixture, while still in its incomplete state, means for conducting said heated mixture to the engine, and means for mixing atmospheric air with said heated mixture to form a combustible mixture of suitable fuel-air ratio.

10. The combination with an internal combustion engine of heat jacketed rotary means for mechanically vaporizing liquid fuel and a restricted quantity of supporting expansible gas insufficient to support combustion, whereby an incomplete over-rich mixture is formed, means for heating said incomplete over-rich mixture, while still in its incomplete state, and means for conducting said heated mixture to the engine.

11. The combination with an internal combustion engine of means for mechanically producing expansion and contraction to facilitate vaporization of a liquid fuel in a restricted quantity of supporting expansible gas insufficient to support combustion, whereby an incomplete over-rich mixture is formed, means for regulating the relative flow of liquid and expansible gas to the mechanical vaporizer, means for heating the fuel before it enters the vaporizer, means for heating said incomplete over-rich mixture while still in its incomplete state, means for conducting said heated mixture to the engine, and means for mixing atmospheric air with said heated mixture to form a combustible mixture of suitable fuel-air ratio.

12. The combination with an internal combustion engine of means for mechanically producing expansion and contraction to facilitate vaporization of a liquid fuel in a restricted quantity of supporting expansible gas, insufficient to support combustion, whereby an incomplete over-rich mixture is formed, means for regulating the relative flow of liquid and expansible gas to the mechanical vaporizer, means for heating the fuel both at the intake and at the discharge thereof from the vaporizer, means for conducting said heated mixture to the engine, and means for mixing atmospheric air with said heated mixture to form a combustible mixture of suitable fuel-air ratio.

13. The combination with an internal combustion engine, of means for mechanically producing expansion and contraction to faciltate vaporization of a liquid fuel in a restricted quantity of supporting expansible gas, means for regulating the relative flow of liquid and expansible gas to the mechanical vaporizer, means for heating the mixture of liquid and gas, means for conducting said heated mixture to the engine, and means for mixing atmospheric air with said heated mixture to form a combustible mixture of suitable fuel-air ratio.

14. The combination with an internal combustion engine of means for mechanically producing expansion and contraction to facilitate vaporization of a liquid fuel in a restricted quantity of supporting expansible gas, insufficient to support combustion, wherby an incomplete over-rich mixture is formed, means for regulating the relative flow of liquid and expansible gas to the mechanical vaporizer, means for heating said incomplete over-rich mixture before it enters the vaporizer and while still in its incomplete state, means for conducting said heated mixture to the engine, and means for mixing atmospheric air with said heated mixture to form a combustible mixture of suitable fuel-air ratio.

15. The combination with an internal combustion engine of means for mechanically producing expansion and contraction to facilitate vaporization of a mixture of liquid fuel and a supporting expansible gas, means for heating said mixture before it enters the vaporizer, and means for conducting said heated mixture from the vaporizer to the engine.

16. The combination with an internal combustion engine of means for mechanical producing expansion and contraction to facilitate vaporization of a mixture of liquid fuel and a supporting expansible gas, means for heating said mixture before it enters the vaporizer, means for further heating said mixture in the vaporizer, and means for conducting said heated mixture from the vaporizer to the engine.

17. The combination with an internal combustion engine of means for mechanically producing expansion and contraction to faciltate vaporization of a mixture of liquid fuel and a supporting expansible gas, means for heating said mixture at the intake and at the discharge of the vaporizer, and means for conducting said heated mixture from the vaporizer to the engine.

18. The combination with an internal combustion engine of means for mechanically producing expansion and contraction to facilitate vaporization of a mixture of liquid fuel and a supporting expansible gas, means for heating said mixture before it enters the vaporizer, means for conducting said heated mixture from the vaporizer to the engine, and means for mixing atmospheric air with said heated vaporized mixture to form a combustible mixture of suitable fuel-air ratio.

19. The combination with an internal combustion engine of means for mechanically producing expansion and contraction to facilitate vaporization of a mixture of liquid fuel and a supporting expansible gas, means for heating said mixture before it enters the vaporizer, means for further heating said mixture in the vaporizer, and means for conducting said heated mixture from the vaporizer to the engine, means for mixing atmospheric air with said heated vaporized mixture to form a combustible mixture of suitable fuel-air ratio.

20. The combination with an internal combustion engine of means for mechanically producing expansion and contraction to facilitate vaporization of a mixture of liquid fuel and a supporting expansible gas, of means for regulating the relative flow of liquid and expansible gas to the mechanical vaporizer, means for heating said mixture at the intake and at the discharge of the vaporizer, means for conducting said heated mixture from the vaporizer to the engine, and means for mixing atmospheric air with said heated vaporized mixture to form a combustible mixture of suitable fuel-air ratio.

21. The combination with an internal combustion engine, of rotary means for mechanically producing expansion and contraction to facilitate vaporization of a liquid fuel in a restricted quantity of supporting expansible gas insufficient to support combustion, whereby an incomplete overrich mixture is formed, means for regulating the relative flow of liquid and expansible gas to the rotary means, means for heating said incomplete overrich mixture while still in its incomplete state, means for conducting said heated mixture to the engine, and means for mixing atmospheric air with said heated mixture to form a combustible mixture of suitable fuel air ratio.

22. The combination with an internal combustion engine of rotary means for mechanically producing expansion and contraction to facilitate vaporization of a liquid fuel in a restricted quantity of supporting expansible gas insufficient to support combustion, whereby an incomplete overrich mixture is formed, means for regulating the relative flow of liquid and expansible gas to the rotary means, means for conducting said mixture to the engine, and means for mixing atmospheric air with said mixture to form a combustible mixture of suitable fuel air ratio.

23. The combination with an internal combustion engine of means for mechanically producing expansion and contraction to facilitate vaporization of a liquid fuel in a quantity of supporting expansible gas, means for regulating the relative flow of liquid and expansible gas to the mechanical vaporizer, means for heating the mixture of oil and gas, and means to conduct said heated mixture to the engine.

24. The combination with an internal combustion engine, of rotary means for mechanically producing expansion and contraction to facilitate vaporization of a liquid fuel in a quantity of supporting expansible gas, means for regulating the relative flow of liquid and expansible gas to the mechanical vaporizer, and means for conducting said mixture to the engine.

25. The combination with an internal combustion engine of means for mechanically producing expansion and contraction to facilitate vaporization of a liquid fuel in a quantity of supporting expansible gas, means for regulating the relative flow of liquid and expansible gas to the mechanical vaporizer, means for heating the mixture of oil and gas, means to conduct said heated mixture to the engine, said mechanical vaporizer being effective to cause the movement and velocity of the mixture.

26. The combination with an internal combustion engine, of rotary means for mechanically producing expansion and contraction to facilitate vaporization of a liquid fuel in a quantity of supporting expansible gas, means for regulating the relative flow of liquid and expansible gas to the mechanical vaporizer, and means for conducting said mixture to the engine, said mechanical vaporizer being effective to cause the movement and velocity of the mixture.

27. The combination with an internal combustion engine of means for mechanically vaporizing a liquid fuel in a quantity of supporting expansible gas, said means being adapted to rapidly expand and contract the mixture to facilitate the vaporization of said fuel, to apply external mechanical energy whereby a portion of said energy is given up by said means and absorbed by the mixture as internal heat energy, and to propel the mixture thus heated at high velocity toward the engine.

28. The combination with an internal combustion engine, of means for mechanically vaporizing a liquid fuel in a quantity of supporting expansible gas, said means being adapted to successively and rapidly expand portions of said expansible gas and to apply external mechanical energy to heat the mixture and reduce the liquid fuel to a state of division so fine as to adapt it to mix with and float in air.

29. The combination with an internal combustion engine, of means for mechanically vaporizing a liquid fuel in a quantity of supporting expansible gas sufficient to form an overrich mixture, said means being adapted to successively and rapidly expand portions of said expansible gas and to apply external mechanical energy to heat the mixture and reduce the liquid fuel to a state of division so fine as to adapt it to mix with and float in air.

30. The combination with an internal combustion chamber of a charge forming device including rotary means for mechanically vaporizing a liquid fuel in a quantity of supporting expansible gas, said means being adapted to successively and rapidly expand portions of said expansible gas and to apply and convert mechanical energy into heat and thereby heat the mixture and reduce the liquid fuel, to a state of division so fine as to adapt it to mix with and float in air, and to propel said mixture toward the engine.

31. The combination with an internal combustion engine of a charge forming device including rotary means for mechanically vaporizing a liquid fuel in a quantity of supporting expansible gas sufficient to form an overrich mixture, said means being adapted to apply and convert mechanical energy into heat and thereby heat the mixture and reduce the liquid fuel to a state of division so fine as to adapt it to mix with and float in air, and to propel said mixture toward the engine.

32. The combination with an internal combustion engine of a charge forming device including rotary means for mechanically vaporizing a liquid fuel in a quantity of supporting expansible gas sufficient to form an overrich mixture, said means being adapted to successively and rapidly expand portions of said expansible gas and to apply and convert mechanical energy into heat and thereby heat the mixture and reduce the liquid fuel to a state of division so fine as to adapt it to mix with and float in air, and to propel said mixture toward the engine.

In witness whereof I hereunto affix my signature.

WILLIAM E. SHORE